(12) United States Patent
Beck et al.

(10) Patent No.: US 9,124,094 B2
(45) Date of Patent: Sep. 1, 2015

(54) CURRENT SATURATION DETECTION AND CLAMPING CIRCUIT AND METHOD

(71) Applicant: Semiconductor Components Industries, LLC, Phoenix, AZ (US)

(72) Inventors: Riley D. Beck, Eagle Mountain, UT (US); Kent D. Layton, Lehi, UT (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 196 days.

(21) Appl. No.: 13/829,319

(22) Filed: Mar. 14, 2013

(65) Prior Publication Data

US 2014/0268435 A1    Sep. 18, 2014

(51) Int. Cl.
*H02H 3/02*     (2006.01)
*H02H 3/33*     (2006.01)
*H02H 3/28*     (2006.01)

(52) U.S. Cl.
CPC *H02H 3/33* (2013.01); *H02H 3/283* (2013.01)

(58) Field of Classification Search
USPC ........................................................ 361/42
See application file for complete search history.

(56) References Cited

U.S. PATENT DOCUMENTS

| | | | |
|---|---|---|---|
| 3,676,737 A * | 7/1972 | Garzon | 361/45 |
| 3,794,884 A | 2/1974 | Sircom | |
| 3,879,639 A | 4/1975 | Sircom | |
| 3,953,766 A * | 4/1976 | Howell et al. | 361/45 |
| 4,001,646 A | 1/1977 | Howell | |
| 4,021,729 A | 5/1977 | Hudson, Jr. | |
| 4,150,411 A | 4/1979 | Howell | |
| 4,378,579 A | 3/1983 | Hudson, Jr. | |
| 5,206,600 A | 4/1993 | Moehlmann | |
| 5,459,630 A | 10/1995 | MacKenzie et al. | |
| 5,515,001 A | 5/1996 | Vranish | |
| 5,600,524 A | 2/1997 | Neiger et al. | |
| 5,715,125 A | 2/1998 | Neiger et al. | |
| 5,808,574 A | 9/1998 | Johnson et al. | |
| 6,111,733 A | 8/2000 | Neiger et al. | |
| 6,259,996 B1 | 7/2001 | Haun et al. | |
| 6,381,110 B1 * | 4/2002 | Nagashima et al. | 361/23 |
| 6,421,214 B1 | 7/2002 | Packard et al. | |
| 6,426,632 B1 | 7/2002 | Clunn | |
| 6,538,863 B1 * | 3/2003 | Macbeth | 361/42 |
| 6,618,648 B1 | 9/2003 | Shirota et al. | |

(Continued)

OTHER PUBLICATIONS

McEachern, Alexander, A floating-window algorithm for detecting certain power line faults that disrupt sensitive electronic loads, IEEE Trans. on Inst. and Meas., vol. 39, No. 1, Feb. 1990, pp. 112-115.

(Continued)

*Primary Examiner* — Thienvu Tran
*Assistant Examiner* — Angela Brooks
(74) *Attorney, Agent, or Firm* — Rennie William Dover

(57) ABSTRACT

A method and circuit for detecting and clamping current in a ground fault circuit interrupter circuit. In accordance with an embodiment the circuit includes an amplifier connected to a switch, where in the amplifier has an input connected to a first conduction terminal of the switch through a resistor and another input connected to a second conduction terminal of the switch. An output of the amplifier is connected to a control terminal of the switch. The circuit may include a ground fault circuit interrupter engine having an input connected to the first conduction terminal of the switch and another second input connected to the second conduction terminal of the switch.

19 Claims, 2 Drawing Sheets

(56) References Cited

U.S. PATENT DOCUMENTS

| | | | |
|---|---|---|---|
| 6,674,289 B2 | 1/2004 | Macbeth | |
| 6,707,652 B2 * | 3/2004 | Engel | 361/42 |
| 6,807,035 B1 | 10/2004 | Baldwin et al. | |
| 6,807,036 B2 | 10/2004 | Baldwin | |
| 6,873,158 B2 | 3/2005 | Macbeth | |
| 6,946,828 B1 | 9/2005 | Layton | |
| 6,980,005 B2 | 12/2005 | Finlay, Sr. et al. | |
| 7,079,365 B2 | 7/2006 | Brown et al. | |
| 7,154,718 B1 | 12/2006 | Finlay, Sr. | |
| 7,253,629 B1 | 8/2007 | Richards et al. | |
| 7,323,934 B2 | 1/2008 | Huang | |
| 7,336,457 B2 | 2/2008 | Liscinsky, III | |
| 7,684,162 B2 | 3/2010 | Musat et al. | |
| 8,018,235 B2 | 9/2011 | Lewinski et al. | |
| 8,054,593 B2 | 11/2011 | Reid et al. | |
| 8,085,516 B1 | 12/2011 | Armstrong | |
| 8,217,644 B2 | 7/2012 | Younsi et al. | |
| 8,390,297 B2 * | 3/2013 | Beck et al. | 324/509 |
| 2004/0001292 A1 * | 1/2004 | Vanderkolk | 361/42 |
| 2004/0008460 A1 * | 1/2004 | Engel | 361/42 |
| 2005/0083616 A1 * | 4/2005 | Reid et al. | 361/42 |
| 2005/0259369 A1 * | 11/2005 | Schmalz | 361/5 |
| 2006/0125622 A1 | 6/2006 | Baldwin et al. | |
| 2006/0133000 A1 * | 6/2006 | Kimura | 361/93.1 |
| 2008/0022153 A1 | 1/2008 | Wang et al. | |
| 2008/0232007 A1 * | 9/2008 | Musat et al. | 361/45 |
| 2008/0288134 A1 * | 11/2008 | Matsuo et al. | 701/29 |
| 2010/0290164 A1 | 11/2010 | Kinsel | |
| 2011/0080177 A1 * | 4/2011 | Beck et al. | 324/509 |
| 2011/0307910 A1 * | 12/2011 | Nagasato et al. | 720/695 |
| 2012/0275070 A1 * | 11/2012 | Sicard | 361/42 |
| 2013/0214800 A1 * | 8/2013 | Beck et al. | 324/691 |
| 2013/0215537 A1 * | 8/2013 | Beck et al. | 361/42 |
| 2013/0229734 A1 * | 9/2013 | Beck et al. | 361/42 |
| 2014/0210484 A1 * | 7/2014 | Beck et al. | 324/509 |

OTHER PUBLICATIONS

Russell, Don et al., A digital signal processing algorithm for detecting arcing faults on power distribution feeders, IEEE Trans. on Power Delivery, vol. 4, No. 1, Jan. 1989, pp. 132-140.

* cited by examiner

CURRENT SATURATION DETECTION AND CLAMPING CIRCUIT AND METHOD

BACKGROUND

The present invention relates, in general, to electronics and, more particularly, to methods of forming semiconductor devices and structure.

Current transformers have been used in power systems for detecting fault conditions that may generate differential currents in the current transformer. Although current transformers are beneficial in detecting the fault, if the differential current becomes too large, it could cause the transformer core to saturate which limits the time available for differential current detection.

Accordingly, it would be advantageous to have a circuit and method for clamping a current generated in response to the occurrence of a differential current. It would be of further advantage for the circuit and method to be cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
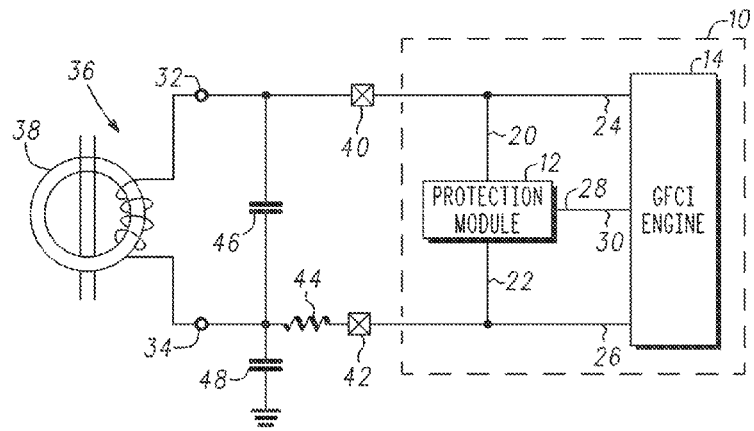
FIG. 1 is a block diagram of a current saturation detection and clamping circuit in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage or logic low voltage level and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level, a logic high voltage, or a logic one voltage and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

Generally, the present invention provides a current saturation detection and clamping circuit and a method for detecting and clamping a current. In accordance with an embodiment of the present invention, the current saturation detection and clamping circuit comprises a switch connected to two amplifiers. More particularly the switch has a control terminal connected to outputs of each amplifier and a current carrying terminal connected to an inverting input of one of the amplifiers through a resistor and to the non-inverting input of the other amplifier through another resistor. Each amplifier has another output connected to a current saturation indicator.

In accordance with another embodiment, a method for detecting and clamping a current is provided. A differential current level of a current flowing in the power mains is detected. In response to the differential current level equaling or exceeding a predetermined value for a predetermined period of time, a current shunt is activated. A saturation signal is generated in response to shunting the current, wherein the saturation signal is used to clamp the differential current level.

FIG. 1 is a block diagram of a current saturation detection and clamping circuit 10 in accordance with an embodiment of the present invention. Detection and clamping circuit 10 includes a protection module 12 coupled to a ground fault circuit interrupter ("GFCI") engine 14 and to a current transformer 36. More particularly, protection module 12 has input terminals 20 and 22 connected to input terminals 24 and 26, respectively, of GFCI engine 14 and an output terminal 28 connected to an input terminal 30 of GFCI engine 14. In addition, terminal 22 is connected to terminal 34 of current transformer 36 through an input/output pin 42 and a resistor 44 and terminal 20 is connected to terminal 32 of current transformer 36 through an input/output pin 40. Although current transformer 36 is shown as a single current transformer having windings 38, this is not a limitation of the present invention. For example, protection module 12 and GFCI engine 14 can be connected to a dual core transformer. GFCI engine 14 may also be referred to as a GFCI module. It should be noted that resistor 44 is an optional element and may be absent.

GFCI engine 14 may include circuits or modules such as, for example, a digital control circuit, a main level/zero crossing detector, a digital filter, a circuit element parameter measurement network, a grounded neutral detector, a differential current detector, an offset correction circuit, and a stimulus waveform generator. An example of a GFCI engine 14 may be found in U.S. Pat. No. 8,390,297, titled "Ground Fault Circuit Interrupter and Method," issued to Riley Beck et al. on Mar. 5, 2013, which is hereby incorporated by reference in its entirety. In addition, GFCI engine 14 may include a bias voltage generator.

A filter capacitor 46 may be connected between terminals 32 and 34 and a bypass capacitor 48 may be connected between terminal 34 and a source of operating potential such as, for example, ground.

Figure 2:
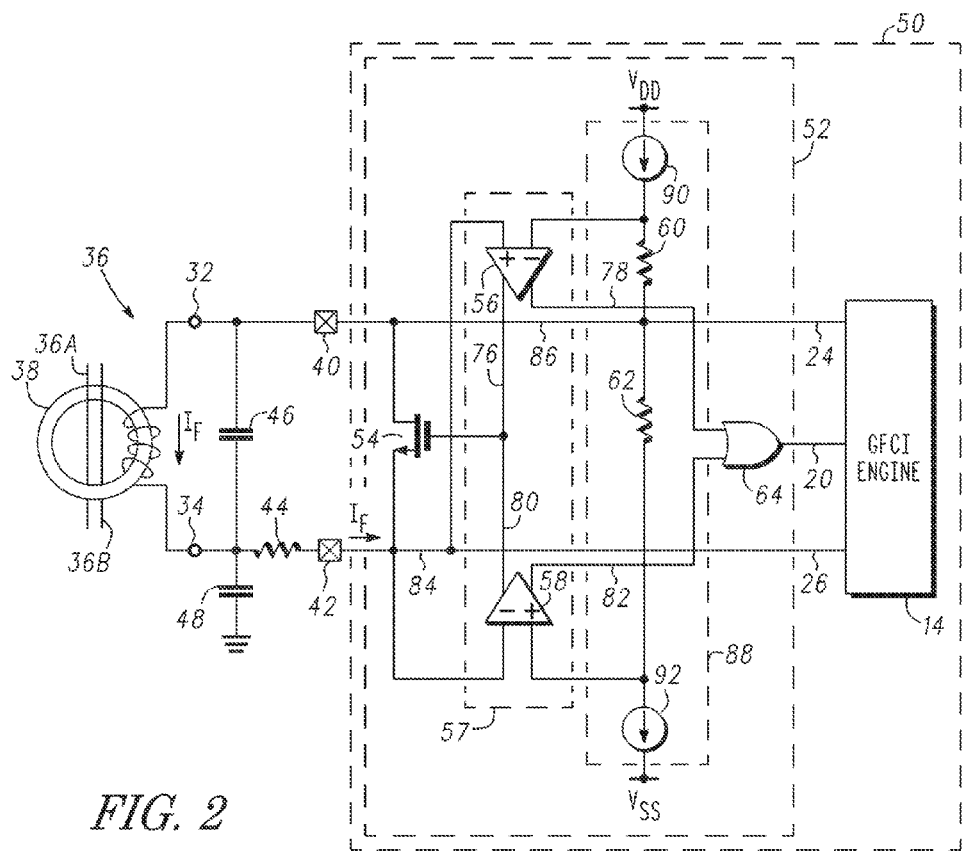
FIG. 2 is a circuit schematic of a current saturation detection and clamping circuit in accordance with another embodiment of the present invention.

FIG. 2 is a block diagram of a current saturation detection and clamping circuit 50 in accordance with another embodiment of the present invention. What is shown in FIG. 2 is a protection module 52 comprising a switch 54, a drive circuit 57, a bias network 88, and a saturation indicator circuit 64. By way of example, switch 54 is a transistor, drive circuit 57 may be include amplifiers 56 and 58, bias network 88 may be comprised of impedances 60 and 62 and current sources 90 and 92, and saturation indicator circuit 64 is a logic gate such as, for example, an OR gate. Amplifiers 56 and 58 may be operational amplifiers and may be referred to as gain stages. It should be noted that the control terminal of a switch is analogous to the control electrode of a transistor and the conduction terminals of a switch are analogous to the current carrying electrodes of a transistor. Although transistor 54 is shown as being a field effect transistor, this is not a limitation of the present invention. Alternatively, switch 54 can be a bipolar transistor, a junction field effect transistor, or the like. Transistor 70 has a control electrode and current carrying electrodes, wherein the control electrode is a gate electrode and the current carrying electrodes are drain and source electrodes. Amplifier 56 has an inverting input, a non-inverting input, and outputs 76 and 78. Likewise, amplifier 58 has an inverting input, a non-inverting input, and outputs 80 and 82. The non-inverting input of amplifier 56 is commonly connected to the inverting input of amplifier 58 and to the source of transistor 54 to form an input/output terminal or node 84 that is connected to input 26 of GFCI engine 14 and to input pin 42. Output 76 of amplifier 56, output 80 of amplifier 58, and the gate of transistor 54 are commonly connected together. In accordance with an embodiment, impedances 60 and 62 are resistors. A terminal of resistor 60 is connected to the inverting input of amplifier 56 and to a terminal of a current source 90. The other terminal of current source 90 may be coupled for receiving a source of operating potential such as, for example, operating potential $V_{DD}$. The other terminal of resistor 60 is connected to the drain of transistor 54 to form an input/output terminal or node 86 that is connected to input 24 of GFCI engine 14 and to input pin 40. A terminal of resistor 62 is connected to the non-inverting input of amplifier 58 and to a terminal of a current source 92 and the other terminal of resistor 62 is connected to input/output node 86, i.e., to a terminal of resistor 60 and to the drain of transistor 54. The other terminal of current source 92 may be coupled for receiving a source of operating potential such as, for example, operating potential $V_{SS}$. Resistors 60 and 62 and current sources 90 and 92 form bias network 88, wherein the node formed by the connection of terminals of resistors 60 and 62 serve as a common node, e.g., input/output node 86 and the other terminals of resistors 60 and 62 serve as terminals of bias network 88. Outputs 78 and 82 of amplifiers 56 and 58 are connected to corresponding inputs of OR gate 64. The output of OR gate 64 is connected to an input 30 of GFCI engine 14.

In addition, input/output terminal 84 is connected to terminal 34 through input/output pin 42 and resistor 44, and input/output terminal 86 is connected to terminal 32 through input/output pin 40. It should be noted that resistor 44 is an optional element and may be absent. Although current transformer 36 is shown as a single current transformer having windings 38, this is not a limitation of the present invention. Protection module 52 and GFCI engine 14 can be connected to a dual core transformer.

A filter capacitor 46 may be connected between terminals 32 and 34 and a bypass capacitor 48 may be connected between terminal 34 and a source of operating potential such as, for example, ground.

In accordance with embodiments of the present invention, GFCI engine 14 has at least an output 24 and inputs 26 and 30, where input 30 is coupled to a signal generator that indicates the saturation state of current transformer 36.

In operation, GFCI module 14 generates a bias voltage $V_{bias}$ at output 24 which is transmitted to output pin 40 via input/output node 86. In addition, current sources 90 and 92 and the resistance values of resistors 60 and 62 are configured to generate a current that flows through resistors 60 and 62 to set predetermined voltages at the non-inverting input of amplifier 56 and the inverting input of amplifier 58. The current levels of current sources 90 and 92 and the resistance values of resistors 60 and 62 are selected to generate an upper reference voltage at the inverting input of amplifier 56 that is greater than bias voltage Vbias and to generate a lower reference voltage at the non-inverting input of amplifier 58 that is less than reference voltage Vbias. For example, GFCI engine 14 may be configured to generate a bias voltage Vbias of about 2 volts, current source 90 and resistor 60 may be configured to generate a voltage of about 2.1 volts at the inverting input of amplifier 56, and current source 92 and resistor 62 may be configured to generate a voltage of about 1.9 volts at the non-inverting input of amplifier 58. The voltages generated at input/output nodes 86 and 84 by resistors 60 and 62 and current sources 90 and 92 may be referred to as clamping voltages, where the clamping voltage at input/output node 86 is an upper clamping voltage and the clamping voltage at input/output node 84 is a lower clamping voltage.

In response to a negligible differential current flowing the power mains, i.e., conductors 36A and 36B, or substantially zero differential current flow, substantially zero current flows in windings 38, and the voltage at input/output node 84 is substantially equal to the voltage at input/output node 86, i.e., the voltage at input/output node 84 is substantially equal to the voltage generated at output 24 by GFCI engine 14. In response to a voltage substantially equal to the voltage at output 24 appearing at input/output node 84, amplifiers 56 and 58 operate in an open loop configuration in which amplifier 56 generates a low voltage level at output 76 and amplifier 58 generates a low voltage level at output 80. The low voltage levels at outputs 76 and 80 appear at the gate of transistor 54, turning off transistor 54. Thus, amplifier 56 serves as a drive circuit for transistor 54 and amplifier 58 serves as a drive circuit for transistor 54. It should be noted that high voltages appear at outputs 78 and 82 of amplifiers 56 and 58, respectively, resulting in a logic high voltage level appearing at input 30 of GFCI engine 14.

In response to a high differential current appearing in the power mains, i.e., conductors 36A and 36B, a fault current $I_F$ flows in windings 38 due to a fault condition at line conductor 36A or at neutral conductor 36B, an internal shunt is enabled that shunts current away from input terminal 26. By way of example, a high differential current may by 750 milliamps, one amp, or another user defined current value. More particularly, a fault condition that causes a current $I_F$ to flow towards input pin 42 lowers the voltage appearing at input/output node 84. If the differential current is sufficiently high to cause the voltage at input/output node 84 to fall below the voltage at the non-inverting input of amplifier 58, amplifier 58 generates a high voltage at output 80 whereas amplifier 56 continues to generate a low voltage at output 76. The resulting voltage at the gate of transistor 54 and the drain-to-source voltage of transistor 54 are sufficient to turn it on thereby activating a current shunt. More particularly, current $I_F$ flows through transistor 54 and back into current transformer 36, i.e., current $I_F$ is shunted away from GFCI engine 14 and the voltage at input/output node 84 is clamped at the voltage at the non-inverting input of amplifier 58. Thus, transistor 54 forms a current shunt.

Likewise, a fault condition that causes a current $I_F$ to flow towards input pin 40 raises the voltage appearing at input/output node 84. If the differential current is sufficiently high to cause the voltage at input/output node 84 to rise above the upper reference voltage at the inverting input of amplifier 56, amplifier 56 generates a high voltage at output 76 whereas amplifier 58 continues to generate a low voltage at output 80. The resulting voltage at the gate of transistor 54 and the drain-to-source voltage of transistor 54 are sufficient to turn it on thereby activating a current shunt. Current $I_F$ flows through transistor 54 and back into current transformer 36, i.e., current $I_F$ is shunted away from GFCI engine 14 and the voltage at input/output node 84 is clamped at the voltage at the inverting input of amplifier 56.

By way of example, circuit 50 may be designed so that a differential current of one ampere generates a fault current $I_F$ sufficiently large to activate the current shunt, e.g., a current of one ampere. In addition, circuit 50 may be designed so that the voltage appearing at the inverting input of amplifier 56 is about 2.1 volts, the voltage generated at GFCI engine output 24 is about 2 volts, and the voltage at the non-inverting input of amplifier 58 is about 1.99 volts. In this example, a fault current $I_F$ that causes amplifier 58 to generate a high output signal at gate 50 clamps the voltage of input/output node 84 at 1.9 volts and a fault current $I_F$ that causes amplifier 56 to generate a high output signal at gate 50 clamps the voltage of input/output node 84 at 2.1 volts.

Amplifiers 56 and 58 have outputs 78 and 82, respectively, connected to corresponding inputs of OR gate 64, which has an output connected to input 30 of GFCI engine 14. In response to an input of OR gate 64 transitioning to a logic high voltage level, a signal at the output of OR gate 64 transitions to a logic high voltage, indicating that current transformer 36 is operating in a saturated state. In response to the output signal of OR gate 64 being at a logic high voltage level for a predetermined period of time, GFCI engine 14 generates an indicator signal indicating that the core is saturated. In response to the indicator signal being asserted for a predetermined time, the ground fault interrupter circuit generates a fault signal. It should be noted that the present invention is not limited to using a logic gate such as OR gate 64 to indicate saturation of current transformer 36 and the presence of a fault.

Figure 3:
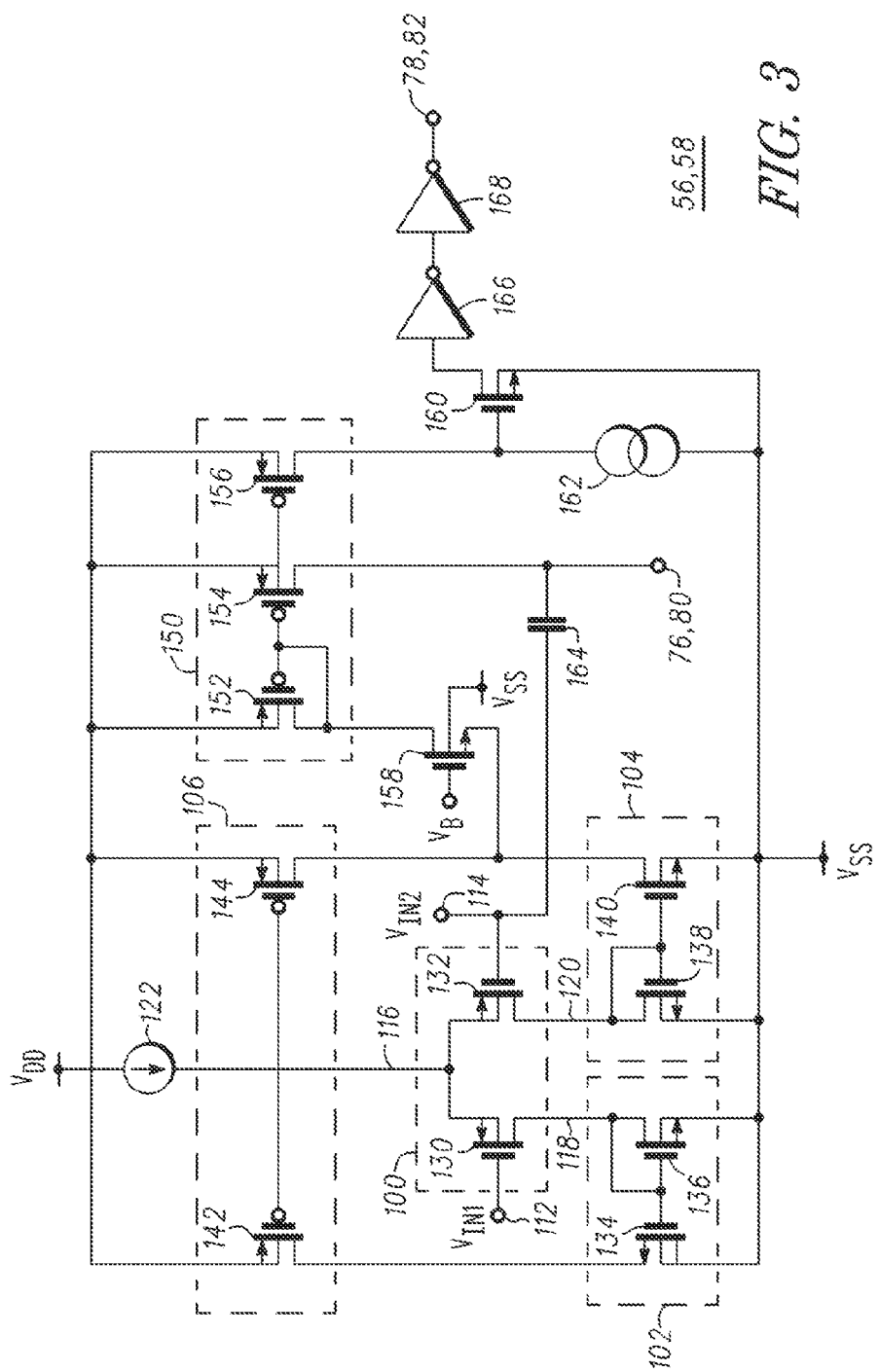
FIG. 3 is a circuit schematic of a portion of the current saturation detection and clamping circuit of FIG. 2 in accordance with an embodiment of the present invention.

FIG. 3 is a circuit schematic of amplifiers 56 and 58 in accordance with an embodiment of the present invention. What is shown in FIG. 3 is a differential input stage 100 connected to current mirrors 102, 104, and 106. Differential input stage 100 has inputs 112 and 114 coupled for receiving input signals $V_{IN1}$ and $V_{IN2}$, respectively, a current carrying terminal 116 connected to a current source 122, a current carrying terminal 118 connected to current mirror 102, and a current carrying terminal 120 connected to current mirror 104. By way of example, differential input stage 100 is comprised of a pair of p-channel transistors 130 and 132, each having a gate, a source, and a drain, wherein the sources are commonly connected together to form current carrying terminal 116, the gates of transistors 130 and 132 serve as or, alternatively, may be connected to inputs 112 and 114, respectively, and the drains of transistors 130 and 132 serve as or, alternatively, may be connected to current carrying terminals 118 and 120, respectively. Current source 122 has terminal coupled for receiving a source of operating potential such as, for example, $V_{DD}$, and a terminal connected to current carrying terminal 116.

Current mirror 102 includes n-channel transistors 134 and 136, where each transistor has a gate, a source, and a drain, and wherein the sources of transistors 134 and 136 are commonly connected together, the gates of transistor 134 and 136 are commonly connected together and to the drains of transistors 136 and 130, i.e., the gates of transistors 134 and 136 and the drain of transistor 136 are commonly connected to current carrying terminal 118.

Current mirror 104 includes n-channel transistors 138 and 140, where each transistor has a gate, a source, and a drain, and wherein the sources of transistors 138 and 140 are commonly connected together, the gates of transistor 138 and 140 are commonly connected together and to the drains of transistors 138 and 132, i.e., the gates of transistors 138 and 140 and the drain of transistor 136 are commonly connected to current carrying terminal 120.

Current mirror 106 includes p-channel transistors 142 and 144, where each transistor has a gate, a source, and a drain, and wherein the sources of transistors 142 and 144 are commonly connected together and for receiving a source of operating potential such as, for example, $V_{DD}$, the gates of transistor 142 and 144 are commonly connected together and to the drains of transistors 142 and 134. The drain of transistor 144 is connected to the drain of transistor 140.

Amplifiers 56 and 58 further include a current mirror 150 that includes p-channel transistors 152, 154, and 156, where each transistor has a gate, a source, and a drain, and wherein the gates of transistors 152, 154, and 156 are commonly connected together and to the drain of transistor 152 and the sources of transistors 152, 154, and 156 are commonly connected together and for receiving a source of operating potential such as, for example, $V_{DD}$. An n-channel transistor 158 has a gate coupled for receiving a reference voltage $V_B$, a drain connected to the drain of transistor 152 and to the gates of transistors 152, 154, and 156, a source connected to the drains of transistors 140 and 144, and a body terminal coupled for receiving a source of operating potential $V_{SS}$. The drain of transistor 154 is connected to a terminal of a capacitor 164 to form output terminals 76 and 80 of amplifiers 56 and 58, respectively, and the other terminal of capacitor 164 is connected to input 114, i.e., to the gate of transistor 132. The drain of transistor 156 is connected to a terminal of a current source 162, which current source 162 has another terminal coupled for receiving a source of operating potential such as, for example, $V_{SS}$.

In addition, amplifiers 56 and 58 may include a transistor 160, which has a gate connected to the drain of transistor 156 and to current source 162, a source coupled for receiving a source of operating potential $V_{SS}$, and a drain connected to an input of an inverter 166. The output of inverter 166 is connected to the input of an inverter 168 and the output of inverter 168 serves as or, alternatively, is coupled to an output terminals 78 and 82 of amplifiers 56 and 58, respectively.

It should be noted that the body terminals of transistors 134, 136, 138, 140, 158, and 160 are coupled for receiving a source of operating potential such as, for example, operating potential $V_{SS}$, the body terminals of transistors 142, 144, 152, 154, and 156 are coupled for receiving a source of operating potential such as, for example, $V_{DD}$, and the body terminals of transistors 130 and 132 are connected to the drain terminals of transistors 130 and 132, respectively. It should be further noted that transistors 130, 132, 142, 144, 152, 154, and 156 may be n-channel transistors and transistors 134, 136, 138, 140, and 160 may be p-channel transistors. In addition, the transistors may be field effect transistors, bipolar transistors, or the like.

By now it should be appreciated that a current saturation detection and clamping circuit have been provided. More particularly, the current saturation detection and clamping circuit includes a voltage clamp that clamps the voltage at the input of a GFCI engine if the voltage at an input to the GFCI engine exceeds a positive limit or a negative limit. In addition, the circuit clamps the current to inhibit it from resetting the GFCI circuit.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A current saturation detection and clamping circuit, comprising:
    a switch having a control terminal and first and second conduction terminals;
    a first amplifier having first and second inputs and first and second outputs, the first input coupled to the second conduction terminal of the switch and the first output coupled to the control terminal of the switch;
    a first impedance coupled between the second input of the first amplifier and the first conduction terminal of the switch; and
    a ground fault circuit interrupter engine having first and second inputs, the first input coupled to the first conduction terminal of the switch and the second input coupled to the second conduction terminal of the switch.

2. The current saturation detection and clamping circuit of claim 1, further including a second amplifier having first and second inputs and first and second outputs, the first input coupled to the second conduction terminal of the switch and the first output coupled to the control terminal of the switch.

3. The current saturation detection and clamping circuit of claim 2, further including a second impedance coupled between the second input of the second amplifier and the first current conductor of the switch.

4. The current saturation detection and clamping circuit of claim 1, further including a first current source coupled to the second input of the first operational amplifier.

5. The current saturation detection and clamping circuit of claim 4, further including a second current source coupled to the second input of the second operational amplifier.

6. The current saturation detection and clamping circuit of claim 1, wherein the ground fault circuit interrupter further comprises a third input, and further including a saturation indicator circuit having first and second inputs and an output, the first input coupled to the second output of the first amplifier and the output coupled to the third input of the ground fault circuit interrupter.

7. The current saturation detection and clamping circuit of claim 6, wherein the second output of the second amplifier is coupled to the second input of the saturation indicator circuit.

8. The current saturation detection and clamping circuit of claim 6, wherein the saturation indicator circuit comprises an OR gate.

9. A circuit, comprising:
    a transistor having a control electrode and first and second current carrying electrodes;
    a ground fault circuit interrupter engine having a plurality of inputs, a first input of the plurality of inputs coupled to the first current carrying electrode of the transistor and a second input of the plurality of inputs coupled to the second current carrying electrode of the transistor; and
    a drive circuit having a plurality of inputs and an output, the output coupled to the control electrode of the transistor, wherein the drive circuit comprises:
        a first gain stage having first and second inputs and first and second outputs, the first input coupled to the second current carrying electrode of the transistor and serving as a first input of the plurality of inputs; and
        a second gain stage having first and second inputs and first and second outputs, the first input coupled to the second current carrying electrode of the transistor and serving as a second input of the plurality of inputs and the output coupled to the control electrode of the transistor, the outputs of the first and second gain stages coupled together to form the output of the drive circuit.

10. The circuit of claim 9, further including a bias network having first and second terminals and a common node, the first terminal coupled to the second input of the first gain stage, the second terminal coupled to the second input of the second gain stage, and the first current carrying electrode of the transistor coupled to the common node.

11. The circuit of claim 10, wherein the bias network comprises:
    a first resistor having first and second terminals, the first terminal coupled to the second input of the first gain stage and serving as the first terminal of the bias network; and
    a second resistor having first and second terminals, the first terminal of the second resistor coupled to the second terminal of the first resistor to form the common node, the second terminal of the second resistor coupled to the second input of the second gain stage and serving as the second terminal of the bias network.

12. The circuit of claim 11, wherein the bias network further comprises:
    a first current source coupled to the second input of the first gain stage; and
    a second current source coupled to the second input of the second gain stage.

13. The circuit of claim 11, further including a saturation indicator circuit having first and second inputs and an output, the first input coupled to the second output of the first gain stage and the second input coupled to the second output of the second gain stage.

14. The circuit of claim 12, wherein the saturation indicator circuit comprises an OR gate.

15. The circuit of claim 12, further including a current transformer having first and second terminals, the first terminal coupled to the first current carrying electrode of the transistor and the second terminal coupled to the second current carrying electrode of the transistor.

16. A method for detecting a fault condition, comprising:
    detecting a differential current level of a current flowing in a power mains;

activating a current shunt in response to the differential current level generating a voltage at a node that one of exceeds a first reference voltage or is less than a second reference voltage;

clamping the voltage at the node at the first reference voltage in response to the voltage at the node exceeding the first reference voltage or clamping the voltage at the node at the second reference voltage in response to the voltage at the node being less than the second reference voltage;

generating a saturation signal in response to clamping the voltage at the node; and generating a fault detection signal in response to the saturation signal being asserted for a predetermined time.

17. The method of claim 16, wherein activating the current shunt includes turning on a transistor in response to a difference in voltages at first and second inputs of a first amplifier being greater than a predetermined value.

18. The method of claim 16, further including generating the saturation signal in response to at least one output signal from an amplifier being at a logic high voltage level.

19. The method of claim 16, wherein activating the current shunt includes shunting a current to a current transformer.

* * * * *